United States Patent [19]
Hanna

[11] 3,943,590
[45] Mar. 16, 1976

[54] ROCKER PANEL BRUSH MECHANISM

[76] Inventor: Daniel C. Hanna, 1133 SW. Rivington Drive, Portland, Oreg. 97201

[22] Filed: Jan. 2, 1974

[21] Appl. No.: 429,930

[52] U.S. Cl. .......................... 15/21 D; 15/DIG. 2
[51] Int. Cl.² ........................................ B60S 3/06
[58] Field of Search ............ 15/DIG. 2, 21 R, 21 C, 15/21 D, 21 E, 53, 97, 49 C, 50 C, 87; 248/16; 403/143

[56] References Cited
UNITED STATES PATENTS

| 3,070,821 | 1/1963 | Vani | 15/21 D |
| 3,350,733 | 11/1967 | Hanna | 15/21 D |
| 3,750,213 | 8/1973 | Hansen | 15/21 D |
| 3,793,663 | 2/1974 | Lieffring | 15/21 D |
| 3,812,549 | 5/1974 | Hanna | 15/21 D |

*Primary Examiner*—Edward L. Roberts
*Attorney, Agent, or Firm*—Klarquist, Sparkman, Campbell, Leigh, Hall & Whinston

[57] ABSTRACT

A rocker panel brush is journaled in a bearing supported by an adjustable, clamping universal joint carried by an arm mounted by an arbor on an overhead support.

5 Claims, 5 Drawing Figures

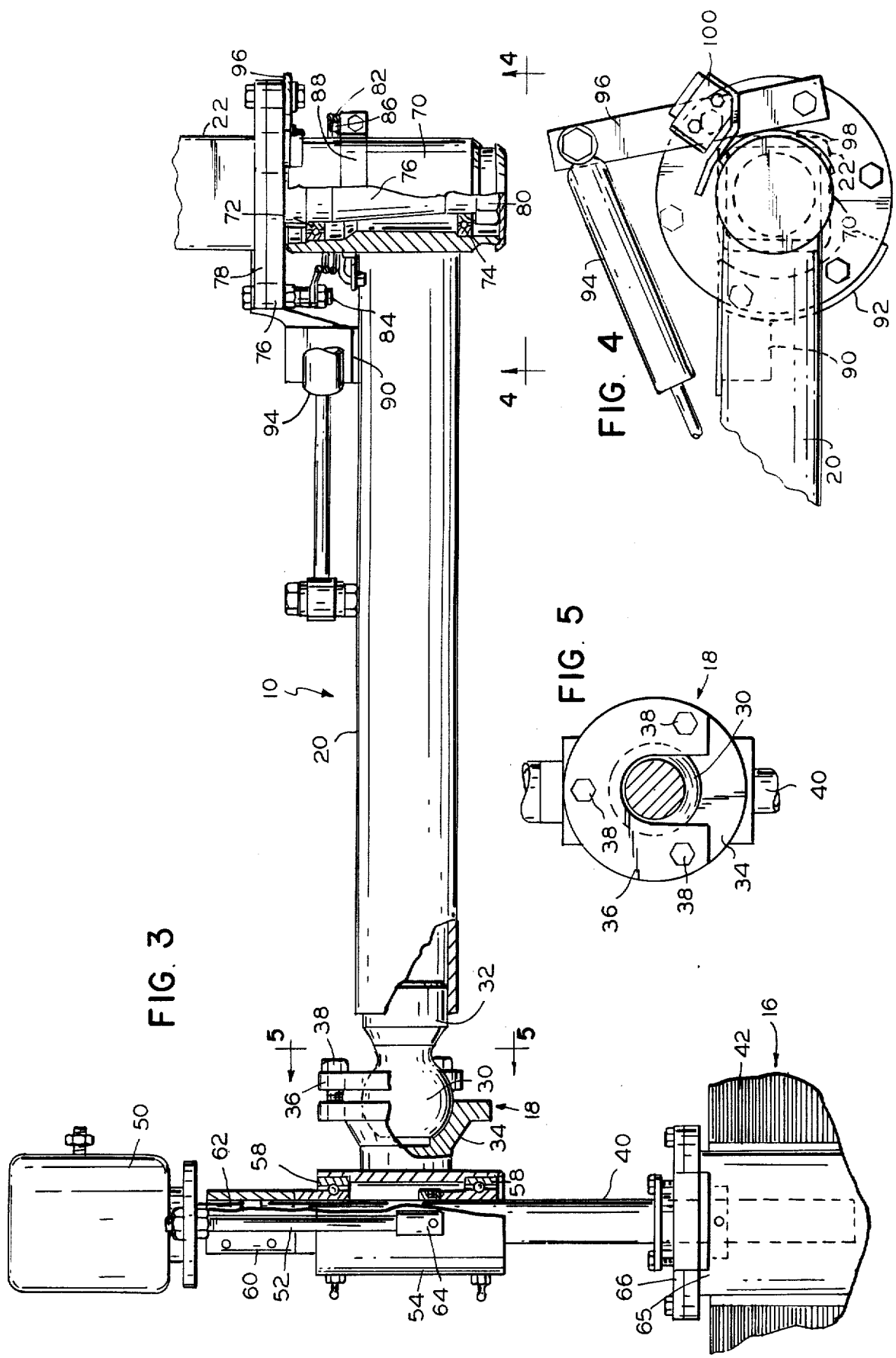

ROCKER PANEL BRUSH MECHANISM

DESCRIPTION

This invention relates to an improved rocker panel brush mechanism, and for an object thereof the provision of an improved rocker panel brush mechanism.

Another object of the invention is to provide a rocker panel brush assembly carrid by arm means having an adjustable, rigid joint.

A further object of the invention is to provide a rocker panel brush mechanism in which an adjustable, rigid universal joint mounts a brush assembly on a pivotally mounted arm.

In the drawings:

FIG. 3 is an enlarged, fragmentary, partially sectional side elevation view of the brush mechanism of FIG. 1;

FIG. 4 is an enlarged, fragmentary, bottom plan view taken along line 4—4 of FIG. 3; and FIG. 5 is an enlarged vertical sectional view taken along 5—5 of FIG. 3.

Figure 1:
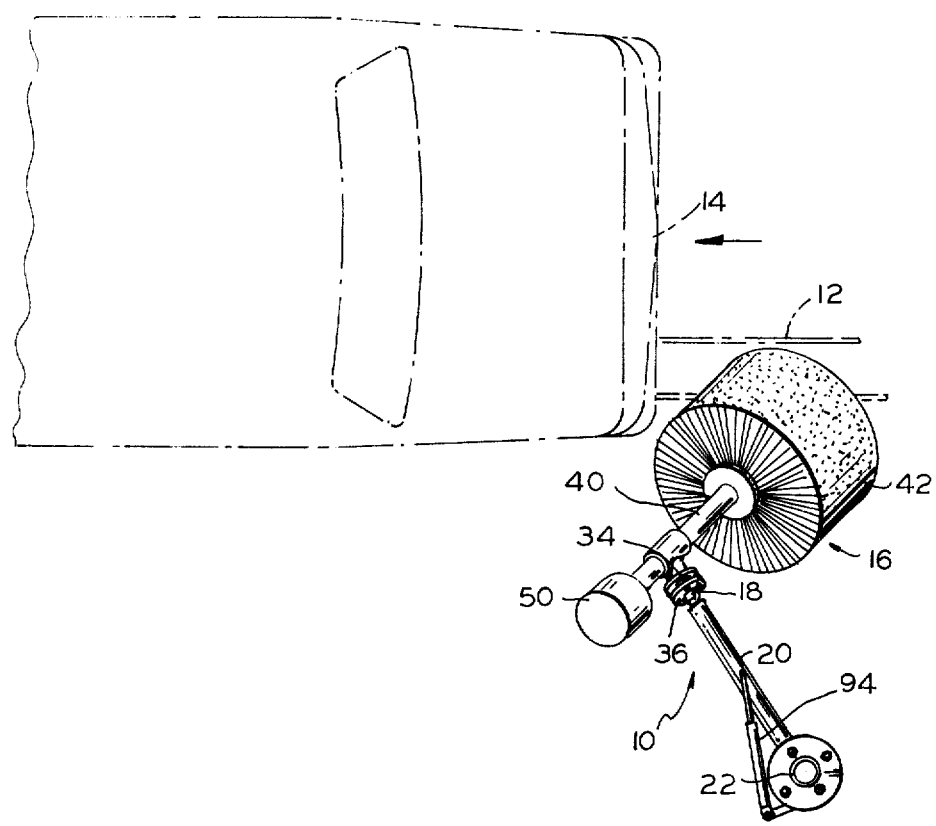
FIG. 1 is a fragmentary top plan view of a car wash including an improved rocker panel brush mechanism forming one embodiment of the invention.
Figure 2:
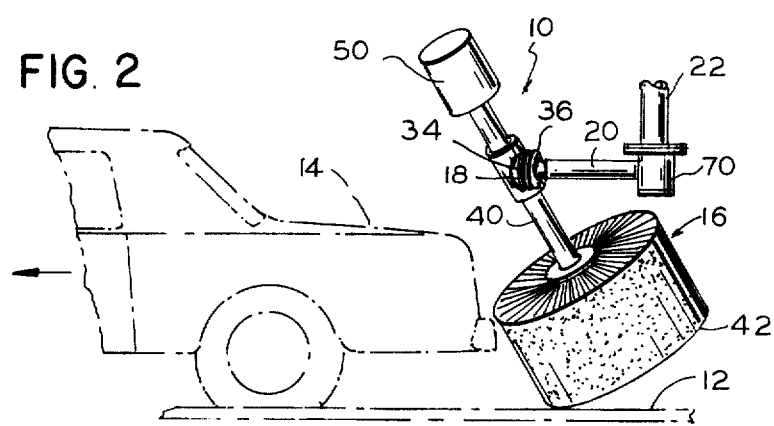
FIG. 2 is a fragmentary side elevation view of the car wash and brush mechanism of FIG. 1.

Referring now in detail to the drawings, there is shown therein a rocker panel brush mechanism 10 forming one embodiment of the invention and mounted in a car wash including a guide track 12 guiding a car 14 through the car wash as it is advanced by a conveyor (not shown). The brush mechanism 10 includes a brush assembly 16 adjustably mounted by an adjustable universal joint 18 on an arm 20 pivotally mounted on an overhead mounted post 22.

The universal joint 18 (FIGS. 3 and 5) includes a ball 30 having a cylindrical shank 32 projecting into and fixed rigidly to the arm 20 by pinning or welding. A flanged socket 34 is relesably clamped rigidly to the ball 30 by a U-shaped clamping plate 36 and capscrews 38 screwed into tapped bores through the flange of the socket 34. The socket can be adjusted universally relative to the horizontal arm by loosening one of the capscrews, which is retightened after arbor 40 is at the desired angle relative to the vertical for best wishing the side and rocker panel portions of the car with a brush 42 carried and rotated by the arbor.

The brush assembly 16 (FIGS. 3 and 5) includes a hydraulic motor 50 connected to rods 52. The motor 50 is carried by sleeve 54 which is integral with socket 34. Radial and thrust bearings 56 and 58 journal the arbor 40 in the sleeve 54, and a coupling 60 connects the arbor 40 to drive shaft 62 of the motor 50. The upper end portions of the rods 52 are threaded and connected to the mounting flange of the motor 50. The lower end of rods 52 telescope into socket members 64 attached to the sleeve 54. The brush 42 has a flanged core 65 bolted to a flange 66 mounted on the arbor 40 to connect the brush core 65 rigidly to the arbor.

The arm 20 (FIGS. 3 and 4) is mounted on the post 22 by a sleeve 70 integral with the arm and journaled on radial-and-thrust bearings 72 and 74 mounted on a flanged post member 76 bolted to a flange 78 on the lower end of the post 22, a nut 80 screwed onto the lower end of the post member 76 holding the bearing 74 on the post member 76. A torsion spring 82 is secured at one end to a bolt 84 extending through the flanges of the post and post member, and the spring is secured at the other end thereof to a lug 86 of a split ring 88 clamped to the sleeve 70. The spring biases the arm 20 clockwise, as viewed in FIG. 4, toward a normal position in which a member 90 on the arm engages a stop 92 bolted to the flange 78. A shock absorber 94 is connected between the arm 20 and the offsetting bar 96 fixed to the flange of the post member 76. When the car engages the brush and springs the arm 20, a cam 98 fixes to the sleeve 70 actuates a value 100 to supply water to nozzles to spray the brush and the areas of the car adjacent the brush.

The universal joint 18 enables the axis of rotation of the brush 42 to be easily adjusted to the optimum angle for brushing the lower side and rocker panel portions of the car. It permits rotative adjustment about the longitudinal axis of the arm 20 and also permits substantial rotative adjustment about axes transverse to the longitudinal axis of the arm 20. Thus, universal adjustment may be made.

What is claimed is:

1. In a brush mechanism,
  a brush assembly including a rotary brush rotatable on a predetermined axis,
  movable arm means,
  means mounting the arm means adjacent a predetermined path of a car,
  and rigid adjustable joint means mounting the brush means on the arm means, the joint means including a ball, a socket, and a clamp adapted to clamp the ball in the socket.

2. The brush mechanism of claim 1 wherein the clamp comprises a U-shaped plate and bolt means securing the plate to the socket.

3. In a brush mechanism,
  an arm,
  means mounting the arm pivotally on a vertical axis,
  spring means biasing the arm toward a nominal position,
  a ball mounted on the arm,
  a socket mounted on and receiving the ball,
  a clamping plate secured to the socket and pressing the ball into the socket,
  bearing means carried by the socket,
  a brush shaft journaled in the bearing means,
  a motor mounted on the socket, and driving the shaft,
  and a brush carried by the shaft.

4. In a brush mechanism,
  a brush assembly including a rotary brush rotatable on a predetermined axis,
  movable arm means,
  an overhead post extending downwardly,
  means mounting the arm means rotatably on the lower end of the post and adjacent a predetermined path of a car,
  rigid adjustable joint means mounting the brush means on the arm means,
  the mounting means including thrust bearing means mounted on the post,
  the arm means including a sleeve portion enclosing and mounted on the thrust bearing means,
  the post means including a flange,
  torsion spring means mounted on the post means and connected to the arm means and the flange and biasing the arm means in a predetermined direction,
  and stop means on the flange and the arm means for limiting movement of the arm means in said direction.

5. The brush mechanism of claim 4 including valve means mounted on the flange, and actuator means mounted on the sleeve portion for closing the valve means when the arm means is in one rotative position.

* * * * *